DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 819

T900,010

BLUE COLLOIDAL SILVER IMAGING SYSTEM

David Clayton Shuman, Kodak Park,
Rochester, N.Y. 14650

Filed Sept. 10, 1971, Ser. No. 179,388
Int. Cl. G03c *1/16, 5/24, 5/26*
U.S. Cl. 96—50
1 Sheet Drawing. 12 Pages Specification

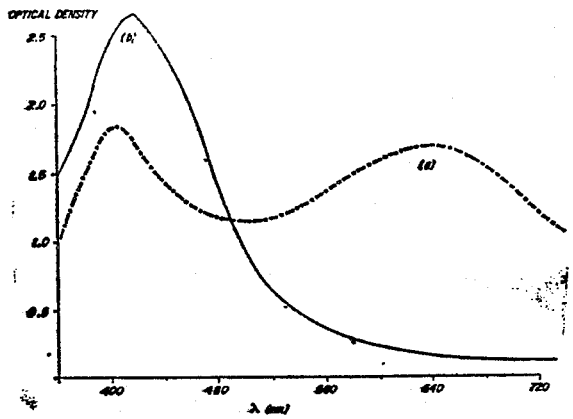

Blue colloidal silver having an average diameter range from about 50 A. to about 300 A. is prepared by physical development of silver nuclei having an average diameter of about 10 A. to about 200 A. coated on a support. An image may be obtained in the blue silver by contacting it with halide ions which causes the blue silver to recrystallize to a yellow form. Contacting a slightly moistened finger against blue silver with light pressure results in a fingerprint of excellent quality in the form of yellow silver. Halide ions may be transferred from an exposed and developed silver halide layer with recrystallization of the blue silver occurring in the area that corresponds to the exposed and developed silver halide. The resulting image can be stabilized by contacting with a phenyl mercapto tetrazole solution.

July 18, 1972 D. C. SHUMAN T900,010
BLUE COLLOIDAL SILVER IMAGING SYSTEM
Filed Sept. 10, 1971
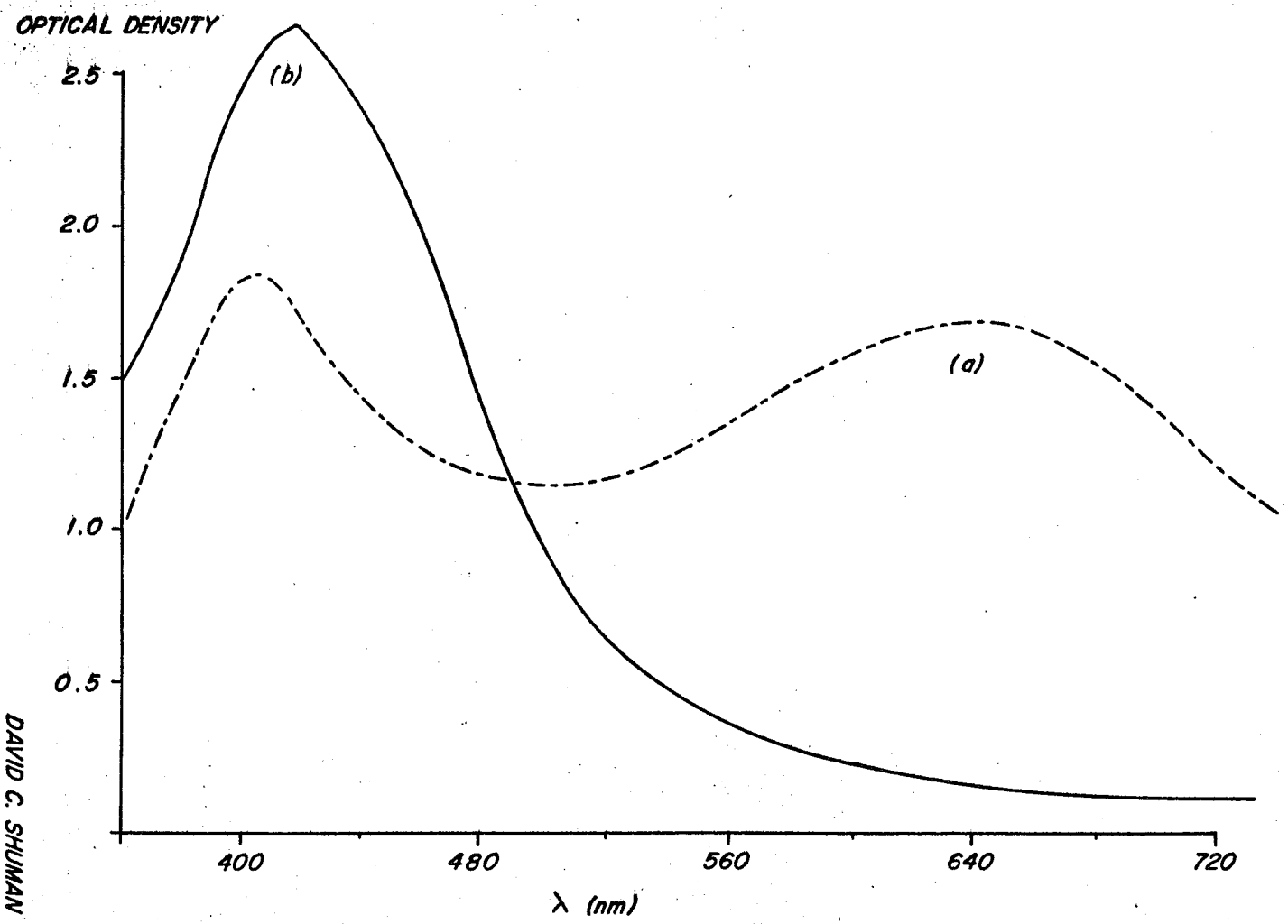
DAVID C. SHUMAN
INVENTOR.
BY Henry E. Byers
ATTORNEY